(12) United States Patent
Kashikar

(10) Patent No.: US 8,437,749 B2
(45) Date of Patent: May 7, 2013

(54) METHOD, SYSTEM, AND APPARATUS FOR NETWORK TIME AND DATE DETERMINATION

(75) Inventor: Anand Devidas Kashikar, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 12/732,713

(22) Filed: Mar. 26, 2010

(65) Prior Publication Data
US 2011/0237237 A1 Sep. 29, 2011

(51) Int. Cl.
*G04B 19/22* (2006.01)
(52) U.S. Cl.
USPC ............... 455/419; 368/10; 368/21
(58) Field of Classification Search ............ 368/10, 368/21; 455/419
See application file for complete search history.

(56) References Cited

U.S. PATENT DOCUMENTS

| 5,724,316 A * | 3/1998 | Brunts | 368/10 |
| 6,876,600 B2 * | 4/2005 | Ito et al. | 368/21 |

\* cited by examiner

*Primary Examiner* — William D Cumming

(57) ABSTRACT

A wireless device searches for a network to establish a connection, and, when a network is found, the wireless device attempts to establish a connection. The wireless device receives a PLMN code from the network. The wireless device receives the current GMT time from a GPS satellite. The wireless device determines the time zone that the wireless device is located in using the PLMN code. The wireless device determines the daylight saving time settings using the PLMN code and/or the GMT time. The wireless device determines the current time and date for the present location of the wireless device using the received GMT time and the determined time zone and day light saving time settings. The wireless device is updated to reflect the current time, date, time zone, and daylight saving settings.

20 Claims, 3 Drawing Sheets

METHOD, SYSTEM, AND APPARATUS FOR NETWORK TIME AND DATE DETERMINATION

TECHNICAL FIELD

The present disclosure relates in general to wireless telecommunication systems and, in particular, to methods and apparatus for determining information relating to the current time and date on a wireless device, a mobile device, or a portable device using a wireless network.

BACKGROUND

Wireless devices which use a network may receive time and date data from the network, including for example, the current date, time, time zone, and/or daylight saving time settings. For example, mobile devices accessing the GSM network and/or the UMTS network can optionally receive time and date information from the network when a data connection is established. Mobile devices, or portable devices, may include cellular telephones, personal digital assistants or PDAs, smartphones, laptops, netbooks, tablet computers, etc. A typical third generation ("3G") cellular telephone may access the UMTS network, and when a connection on the UMTS network is unavailable, the 3G cellular telephone may access the GSM network.

However, in various networks, there is no way for a mobile device to receive time and date information from the network. Further, if a device is camped on a limited service mode and a normal service connection cannot be established, time and date information cannot be received. For example, a 3G cellular telephone may be unable to access a normal service connection on the UMTS network or the GSM network, and may only be allowed to camp for emergency calls when a normal service connection cannot be established.

When a mobile device user travels with the device, the time and date information of the device may become incorrect based on the user's new location and/or the passage of time. For example, if a user moves from a location where time information is received from a network, to a location where time information cannot be received from the network, and where only limited service is available from another network, the user's mobile device will not receive time and date information. In this scenario, the user's device may have the incorrect time used with various applications on the device, such as the clock, calendar, email, etc. When a user's mobile device provides erroneous information, it can be confusing and problematic for the user.

The prior art methods of dealing with such problems include requiring the user to manually set the date and time when time and date information cannot be accessed via the network. For example, if time and date information are not received from a network for one minute after a device camps on a network, the user may be prompted to enter time, date, time zone, and/or daylight saving time settings manually. However, a user may simply not know the current time, date, time zone, and/or daylight saving time settings. Further, a user may mistakenly enter an incorrect time or date, for example, when the user has unknowingly moved to a different time zone or an area with different daylight saving time settings, or if the daylight saving time settings have changed. In this scenario, the user may believe they know the current time based on for example, a wrist watch, however, the time on the wrist watch may be incorrect because the user is in a different time zone or area with different daylight saving time settings.

Entering the incorrect date or time can cause considerable chaos for the user. For example, typical problems may include the user being late to a meeting, missing a deadline, or including erroneous time or date information in emails or documents. Moreover, even if the user does enter the correct time and date information, it may still be burdensome for the user to determine the correct time and date information and manually enter that information into the device. The prior art fails to provide a sufficient solution for the above described challenges.

SUMMARY

The present disclosure provides a new and innovative method, system, and apparatus for time and date determination using a wireless network. A wireless device searches for a network to establish a connection, and, when a network is found, the wireless device may attempt to establish a connection. The wireless device receives a PLMN code from the network. The wireless device receives the current GMT time from one or more GPS satellites. The wireless device determines the time zone that the wireless device is located in using the PLMN code. The wireless device determines the daylight saving time settings using the PLMN code and/or the GMT time. The wireless device determines the current time and date for the present location of the wireless device using the received GMT time and the determined time zone and day light saving time settings. The wireless device is updated to reflect the current time, date, time zone, and daylight saving settings.

Additional features and advantages of the disclosed method and apparatus are described in, and will be apparent from, the following Detailed Description and the Figures.

DETAILED DESCRIPTION

Figure 1:
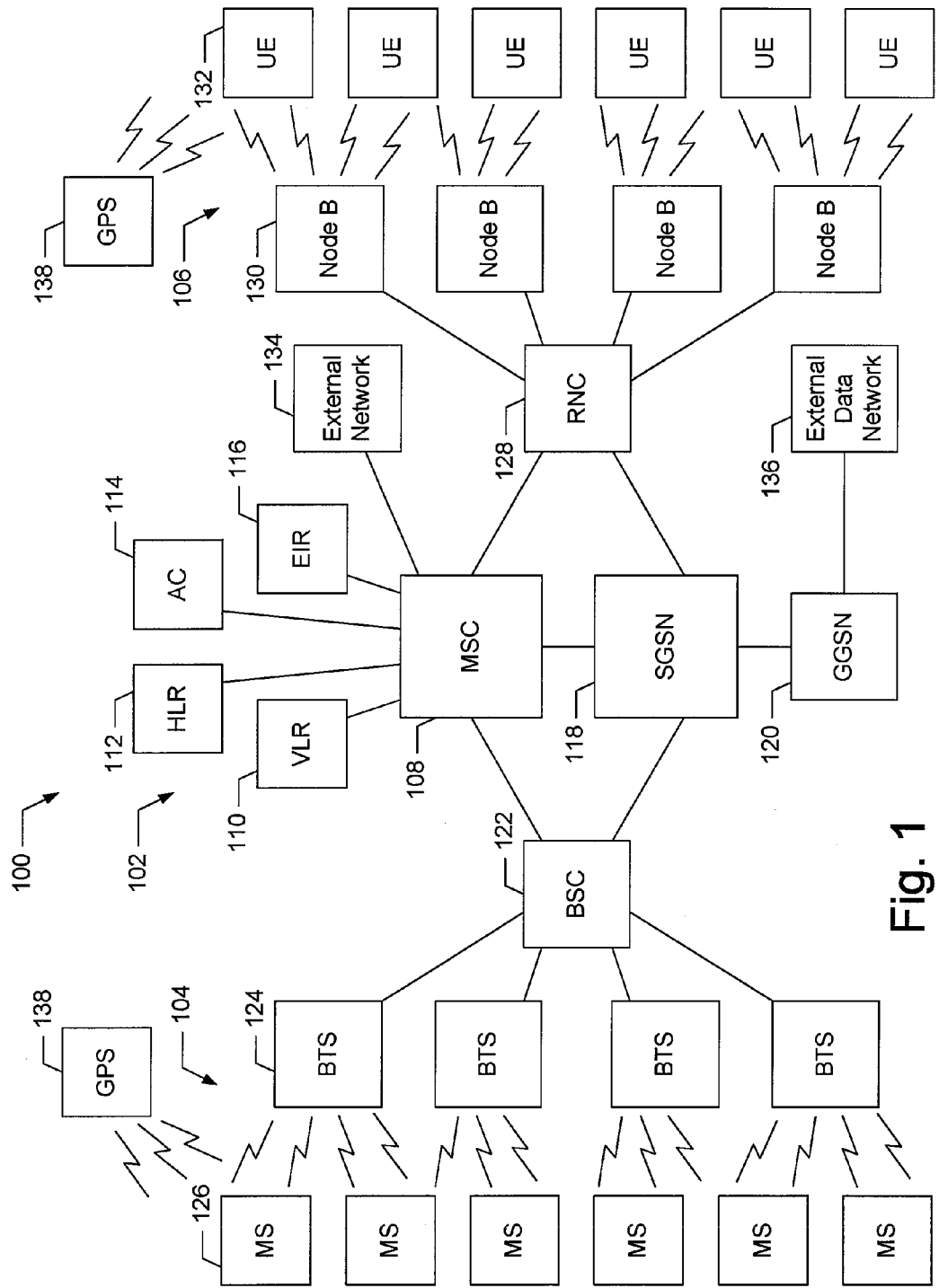
FIG. 1 is a high level block diagram of an example network.

A high level block diagram of an example network 100 is shown in FIG. 1. The example network 100 includes a core network 102, a GSM network 104, and a UMTS network 106. The core network 102 includes various components such as a MSC 108, which is a central component of the core network and performs switching functions of the network and provides connection to other networks. The core network 102 may include a visitor location register ("VLR") 110, home location register ("HLR") 112, authentication center ("AC") 114, and equipment identity register ("EIR") 116. The VLR 110, HLR 112, AC 114, and EIR 116 communicate with the MSC for various network functions including subscriber and mobility management. The core network 102 may include an ("SGSN") 118 and ("GGSN") 120, which provide similar services as the MSC 108 by interfacing with the MSC 108, certain components of the UMTS network 106 and the GSM network 104, and external data networks.

The GSM network 104 may include a Base Station Controller 122 ("BSC") which controls a Base Transceiver Station 124 ("BTS"), which in turn communicate with a Mobile Station 126 ("MS"). The MS 126 may be, for example, a mobile phone, a PDA, laptop, tablet computer, etc. The UMTS network 106 may include a Radio Network Controller 128 ("RNC") which controls a Node B 130, which in turn communicate with a User Equipment 132 ("UE"). The UE 132 may be, for example, a mobile phone, a PDA, laptop, tablet computer, etc. Hereinafter, the term "wireless device" will refer to any wireless device that may function as a MS 126 and/or UE 132, as many currently available wireless devices can seamlessly interface with both the BTS 124 of the GSM network 104 and the Node B 130 of the UMTS network 106. Further, other networks may refer to a wireless device with another term, however, for the purposes of the discussion below, the specific term for a wireless device on a given network is not overly important, for example, whether a wireless device is an MS 126 or a UE 132 is not critical, and devices are often both an MS 126 and a UE 132. It should be appreciated that a wireless device 126/132 includes a transmitter and receiver, or transceiver, for sending and receiving messages at designated frequencies. Further, a wireless device 126/132 typically has one or more memory storage units, such as random access memory ("RAM") and/or electronic programmable read only memory ("EPROM"), which is used to store information related to network connections, system applications, and the current time and date.

The MSC 108 and SGSN 118 may route voice and/or data messages to users of MS 126 or UE 132 through the BSC 122 and BTS 124 of the GSM network 104 and through the RNC 128 and Node B 130 of the UMTS network 106. Further, components of the core network 102 such as the MSC 108 and GGSN 120 may communicate with outside networks. For example, the MSC may communicate with an external network 134, which may be a PSTN, ISDN, PSDN, or PLMN. For example, the GGSN 120 may communicate with an external data network 136, which may be a packet switching network such as the internet or a wide area network. The core network 102 may control all voice and data traffic within a network and between a plurality of networks.

Further, a wireless device 126/132 may receive communications from one or more GPS satellites 138. Typically, at least one GPS satellite 138 is in range to communicate with wireless devices 126/132 in most areas of the world at any given time. The GPS satellites 138 provide GPS coordinates, the current GMT time, and various other information using messages which are transmitted in response to a request from a wireless device 126/132. For example, a wireless device 126/132 may request information from several GPS satellites 138 and, in response, a GPS message may be transmitted from several GPS satellites 138 that are within transmission range of the wireless device 126/132. Accordingly, the wireless device 126/132 receives the messages from the GPS satellites 138, which may be referred to as a GPS fix. The wireless device 126/132 may pull from multiple GPS satellites to improve accuracy and/or reliability of the GPS fix. Typically, as discussed below, the information required for time and date determination is transmitted upon request from a wireless device 126/132, so the wireless device 126/132 will request the GPS fix with regularity, for example, once every second. Accordingly, the disclosed time and date determination techniques may be employed quickly, for example, in two to five seconds. The specific timing of receiving a GPS fix may depend on whether the wireless device 126/132 requires a cold fix, which may take approximately 5 seconds, or a warm fix, which may take less than 2 seconds.

It should be appreciated that the example network 100 illustrated is merely a non-limiting example, and that network components may be arranged in a wide variety of ways, and that various components may be added, replaced, and/or omitted depending upon various factors for a network. Further, although the GSM network 104 and UMTS network 106 are specifically discussed, it should be appreciated that other networks may be similarly employed for time and date determination as described herein.

Figure 2A:
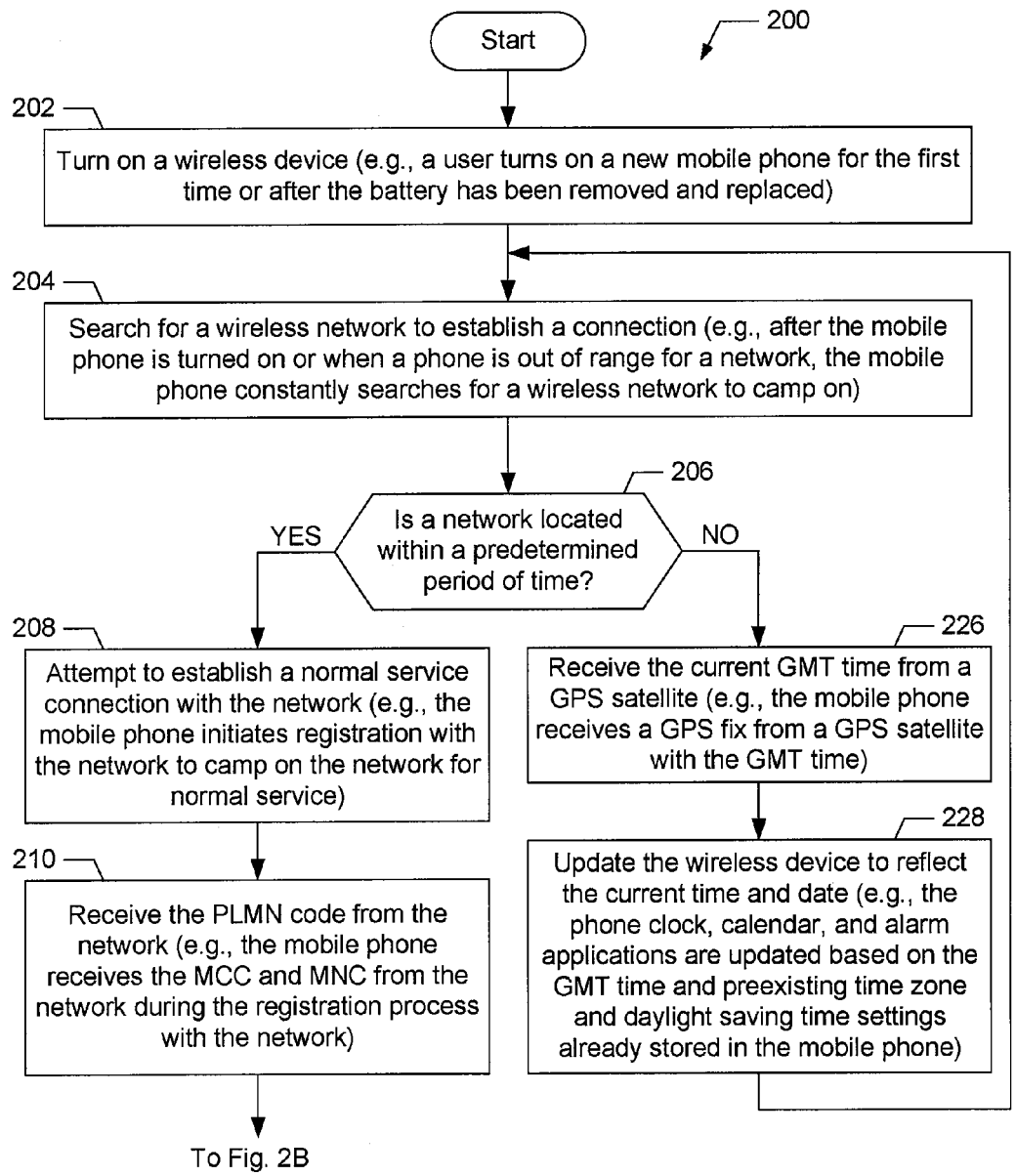
FIGS. 2A and 2B show a flowchart of an example method of time and date determination using a wireless network.
Figure 2B:
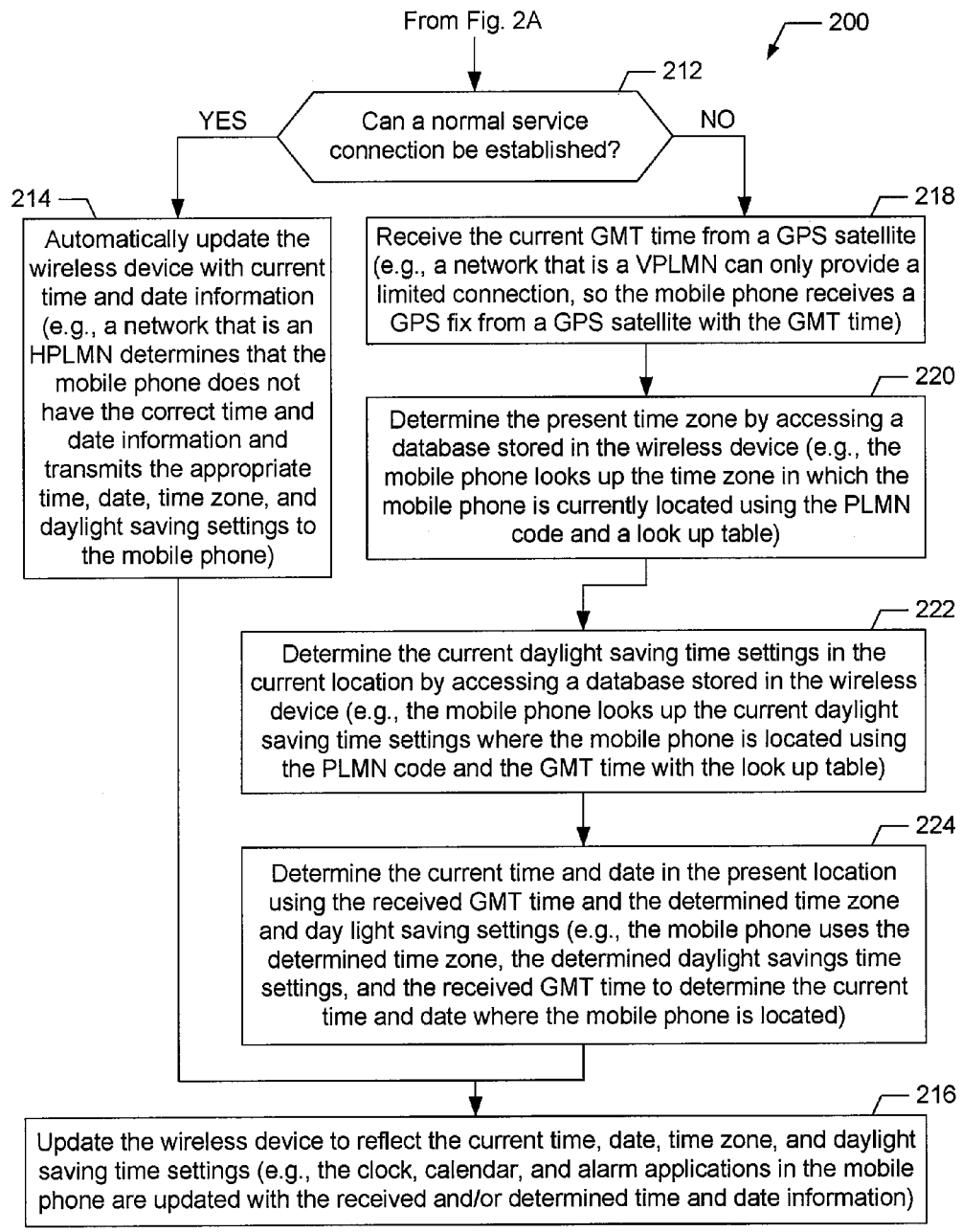

FIGS. 2A and 2B are a flowchart of an example time and date determination process 200. Although the example time and date determination process 200 is described with reference to the flowchart illustrated in FIGS. 2A and 2B, it will be appreciated that many other methods of performing the acts associated with the example time and date determination process 200 may be used. For example, the order of some of the blocks may be changed, and some of the blocks described are optional.

The example time and date determination process 200 may begin with a user turning on a wireless device (block 202). For example, a user turns on a new mobile phone for the first time after the phone is purchased, or a user turns on a mobile phone after the battery has been removed and replaced by the user with a different battery. When the wireless device is on, the wireless device searches for a wireless network to establish a connection with (block 204). For example, after the mobile phone is turned on, the mobile phone constantly searches for a wireless network to camp on. For example, the mobile phone repeatedly and continuously attempts to find a wireless network until a network is found. The networks that the wireless device may search for may include the GSM network 104 and UMTS network 106, so the wireless device may be directly communicating with a BTS 124 and/or a Node B 130. Also, when a mobile phone is out of range for a network, it may be continuously searching for a wireless network to camp on. The wireless device may keep track of the search attempts, including the amount of time that has elapsed since the search began. For example, the wireless device may store a log of search activity in a memory such as RAM. Accordingly, the wireless device may determine whether a network has been located within a predetermined period of time (block 206). For example, the mobile phone may continue to attempt to establish a connection for up to one minute from the time the phone begins searching. Whether the wireless device can locate a network within the predetermined period of time may dictate how the wireless device determines whether the time and date information in the wireless device needs to be updated.

In the example time and date determination process 200, if a network is located within the predetermined period of time, the wireless device will attempt to establish a normal service connection with the network (block 208). For example, the mobile phone initiates registration with the network to camp on the network for normal service. As the wireless device attempts to establish a connection on the network, the wireless device will receive the PLMN code from the network (block 210). For example, the mobile phone receives the MCC and MNC from the network during the registration process with the network. The MCC, or mobile country code, and the MNC, or mobile network code, are each part of the PLMN code, and are used to identify the network with which the wireless device is communicating. The PLMN code may be stored in the mobile phone in a memory such as RAM. The PLMN code is used by various components within the network, such as an MSC 108 and/or an HLR 112. The wireless device may be able to establish a normal service connection with the network based upon various factors, such as whether the wireless device is a subscriber with the network. Accordingly, the wireless device may or may not be able to establish a normal service connection with the network (block 212).

In the example time and date determination process 200, if the wireless device can establish a normal service connection, the wireless device may be automatically updated with current time and date information (block 214). For example, a network that is an HPLMN determines that the mobile phone does not have the correct time and date information and transmits the appropriate time, date, time zone, and daylight saving settings to the mobile phone. Some HPLMNs, or home public land mobile networks, can determine when a wireless device has incorrect time and date information, and can automatically transmit the currently correct information to the wireless device, which may automatically replace the existing information. The transmitted time and date information would typically be stored in a memory such as RAM in the wireless device. Automatic time and date information updates are convenient for the user, who does not need to manually change any settings or request the updated information. Accordingly, the wireless device may be updated to reflect the current time, date, time zone, and daylight saving time settings (block 216). For example, the clock, calendar, and alarm applications in the mobile phone are updated with the received time and date information. Accordingly, the mobile phone user sees the correct time on the display, alarms and meeting reminders go off at the correct time, and emails are time stamped with the current time.

In the example time and date determination process 200, if the wireless device can not establish a normal service connection, the wireless device may receive the current GMT time from a GPS satellite (block 218). For example, a network that is a VPLMN can only provide a limited connection, so the mobile phone receives a GPS fix from one or more GPS satellites with the GMT time. The transmitted GMT time would typically be stored in a memory such as RAM in the wireless device. A VPLMN, or visitor public land mobile network, is not the network that a wireless device is a subscriber of, and thus, may not allow the wireless device to establish a normal service connection. Typically, a limited service connection can be established with a VPLMN. However, a VPLMN typically would not automatically update time and date information on a wireless device. The GMT time, or Greenwich Meridian Time is a time which can be converted into the time for any time zone in the world. GPS satellites, or global positioning system satellites, transmit the current GMT time to a wireless device in response to a request from the wireless device that is enabled to receive the GPS fixes.

Accordingly, once the wireless device has received the current GMT time, the wireless device determines the present time zone by accessing a database stored in the wireless device (block 220). For example, the mobile phone looks up the time zone in which the mobile phone is currently located using the PLMN code and a look up table. The look up table may be stored in a stored in a memory such as EPROM in the wireless device. The table may include information in columns such as MCC, MNC, GMT time, time zone, daylight saving setting, operator name, and coding type. The operator name may include a wireless carrier name and the coding type may be used to specify the coding scheme. A coding type such as 7-bit ASCII may be used for a wireless device with an English speaking user, while a different coding type would be required to support another language with different characters such as Chinese. In an example embodiment, the MCC and MNC may indicate that the mobile phone is located in a specific state, which is searched in the look up table to determine which time zone that state is situated in. Once the time zone has been determined, the wireless device determines the current daylight saving time settings in the current location by accessing a database stored in the wireless device (block 222). For example, the mobile phone looks up the current daylight saving time settings where the mobile phone is located using the PLMN code and the GMT time with the look up table. The state in conjunction with the GMT time may be used to determine what the current day light saving time settings are, which can vary within time zones. For example, one state may implement daylight saving time earlier or later than a nearby state within the same time zone, and thus, the location must be used in conjunction with the current date and time to determine the proper daylight saving time settings. It should be appreciated, that in certain circumstances, the daylight saving time settings may be determinable without using both of PLMN code and the GMT time, for example, in certain countries, daylight saving time is not used during any portion of the year. The determined time zone and daylight saving settings may be stored in a memory of the wireless device such as RAM.

Once the time zone and daylight saving time settings have been determined, the wireless device determines the current time and date in the present location using the received GMT time and the determined time zone and day light saving settings (block 224). For example, the mobile phone uses the determined time zone, the determined daylight saving time settings, and the received GMT time to determine the current time and date where the mobile phone is located. The determined time and date may be stored in a memory of the wireless device such as RAM. Accordingly, the wireless device may be updated to reflect the current time, date, time zone, and daylight saving time settings (block 216). For example, the clock, calendar, and alarm applications in the mobile phone are updated with the received and determined time and date information. Accordingly, the time and date information update occurs automatically, without manual interaction from the user, even though a normal service connection has not been established. Such automatic updates are convenient and user friendly for the user. For example, a user may otherwise not be able to determine the current time, date, time zone, or daylight saving time settings because a data connection may not be available when a user is camped on a limited service connection. Further, the example time and date determination process 200 would typically not incur any roaming costs which may otherwise be required to obtain updated time and date information when a normal service connection could not be established.

As shown in FIG. 2A, in the example time and date determination process 200, if a network is not located within the predetermined period of time, the wireless device receives the current GMT time from a GPS satellite (block 226). For example, the mobile phone receives a GPS fix from one or more GPS satellites with the GMT time. The received GMT time may be stored in a memory of the wireless device such as RAM. Once the current GMT time is known, the wireless device is updated to reflect the current time and date (block 228). For example, the phone clock, calendar, and alarm applications are updated based on the GMT time and preexisting time zone and daylight saving time settings already stored in the mobile phone. When the wireless device is updated only based on the GMT time and preexisting time zone and daylight saving time settings, the time may be incorrect if the user has carried the device to a different area with a different time zone or daylight saving time settings. Accordingly, while the time and date may be updated without determining the current time zone and/or daylight saving time settings, such a method is not fully reliable. Updating a wireless device with GMT time without the current time zone and daylight saving time settings may be referred to as GPS standalone mode, because it is not necessary for the wireless device to camp on any network, so not even a limited service connection is required. Operating in the GPS standalone mode is often desirable. For example, if a new mobile phone is turned on for the first time, and no normal service connection can be made, the new mobile phone may receive and display the current GMT time, until the device can establish a limited service or normal service connection, or until the user manually enters time zone and daylight saving time settings. Accordingly, after the device is updated to reflect the GMT time, the device continues to search for a wireless network to establish a connection (block 204). For example, after the mobile phone is updated with the GMT time, the mobile phone constantly searches for a wireless network to camp on, which will allow the device to further update the time and date information on the mobile phone.

Accordingly, using the example time and date determination process 200 allows a wireless device to be updated with and maintain current time and date information, which greatly benefits a user of the wireless device. Using the example time and date determination process 200 may allow the device to provide a significantly better user experience and may save the user from unpleasant experiences, including but not limited to showing up to an important business meeting late, failing to send an email to a client on time, unnecessarily waking up an hour earlier than required, dating a document improperly, or missing a train. Such calamities may be avoided without any interaction from the user, and at minimal or no cost to the user, providing an improved overall user experience.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for determining time and date on a wireless device, comprising:
   receiving a public land mobile network code from a wireless network at the wireless device;
   in response to determining that the wireless device cannot establish a service connection with the wireless network:
   (i) receiving a Greenwich Mean Time (GMT) time from at least one global positioning system (GPS) satellite at the wireless device;
   (ii) determining a time zone applicable to the wireless device using at least one portion of the public land mobile network code;
   (iii) determining a daylight saving time setting applicable to the wireless device using the received GMT time and the at least one portion of the public land mobile network code; and
   (iv) determining a current time and date of the wireless device using the GMT time, the time zone, and the daylight saving time setting; and
   updating the wireless device with the current time and date.

2. The method of claim 1, wherein the at least one portion of the public land mobile network code is a mobile country code (MCC).

3. The method of claim 1, wherein the at least one portion of the public land mobile network code is a mobile network code (MNC).

4. The method of claim 1, wherein the public land mobile network code includes a mobile country code (MCC) and a mobile network code (MNC), wherein the MCC and the MNC are used to determine at least one of the time zone or the daylight saving time setting.

5. The method of claim 1, further comprising searching for the wireless network in response to activating the wireless device.

6. The method of claim 1, wherein the wireless device includes a database storing information including a mobile country code (MCC), a mobile network code (MNC), a Greenwich Mean Time (GMT) time, a time zone, a daylight saving setting, an operator name, and a coding type.

7. The method of claim 1, wherein updating the wireless device with the current time and date includes updating one or more applications of the wireless device with the current time and date.

8. The method of claim 1, wherein the wireless network is at least one of a Global System for Mobile Communications (GSM) network or a Universal Mobile Telecommunications System (UMTS) network.

9. The method of claim 1, wherein the wireless device is a cellular device.

10. A system for determining time and date on a wireless device, comprising:
    a wireless network; and
    a wireless device;
    wherein the wireless device receives a public land mobile network code from the wireless network;
    wherein in response to determining that the wireless device cannot establish a service connection with the wireless network, the wireless device:
    (i) receives a Greenwich Mean Time (GMT) time from at least one global positioning system (GPS) satellite;
    (ii) determines a time zone applicable to the wireless device using at least one portion of the public land mobile network code;
    (iii) determines a daylight saving time setting applicable to the wireless device using the received GMT time and the at least one portion of the public land mobile network code; and
    (iv) determines a current time and date of the wireless device using the GMT time, the time zone, and the daylight saving time setting; and
    wherein the wireless device updates a user interface of the wireless device with the current time and date.

11. The system of claim 10, wherein the at least one portion of the public land mobile network code is a mobile country code (MCC).

12. The system of claim 10, wherein the wireless device includes a database storing information including a mobile country code (MCC), a mobile network code (MNC), a GMT time, a time zone, a daylight saving setting, an operator name, and a coding type.

13. The system of claim 10, wherein the wireless device updates one or more applications of the wireless device with the current time and date.

14. The system of claim 10, wherein the wireless network is a Global System for Mobile Communications (GSM) network.

15. The system of claim 10, wherein the wireless network is a Universal Mobile Telecommunications System (UMTS) network.

16. The system of claim 10, wherein the public land mobile network code includes a mobile country code (MCC) and a mobile network code (MNC), wherein the MCC and the MNC are used to determine at least one of the time zone or the daylight saving time setting.

17. A wireless device, comprising:

a receiver to receive wireless signals;

a processor coupled to the receiver, the processor to:

receive a public land mobile network code from a wireless network via the receiver;

in response to determining that the wireless device cannot establish a service connection with the wireless network:

(i) receive a Greenwich Mean Time (GMT) time from at least one global positioning system (GPS) satellite via the receiver;

(ii) determine a time zone applicable to the wireless device using at least one portion of the public land mobile network code;

(iii) determine a daylight saving time setting applicable to the wireless device using the GMT time and the at least one portion of the public land mobile network code; and (iv) determine a current time and date of the wireless device using GMT time, the time zone, and the daylight saving time setting;

a memory which stores the public land mobile network code, the GMT time, the time zone, the daylight saving time setting, and the current time and date; and a display device to present the current time and date.

18. The wireless device of claim 17, wherein the public land mobile network code includes a mobile country code (MCC) and a mobile network code (MNC), wherein the MCC and the MNC are used to determine at least one of the time zone or the daylight saving time setting.

19. The wireless device of claim 18, wherein the processor updates one or more applications stored in the memory with the current time and date.

20. The wireless device of claim 19, wherein the wireless network is at least one of a Global System for Mobile Communications (GSM) network or a Universal Mobile Telecommunications System (UMTS) network.

* * * * *